March 6, 1956  H. R. FREUND  2,737,097
APPARATUS FOR FORMING GUIDE INDICIA IN
THE FILM OF PHOTOCOMPOSING MACHINES
Original Filed Jan. 19, 1950  4 Sheets-Sheet 2
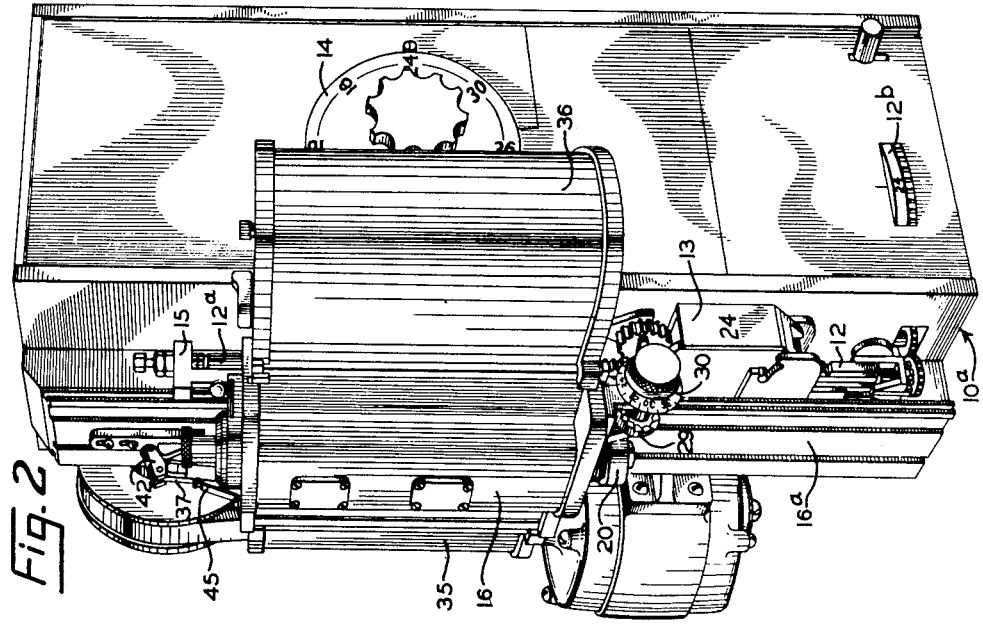
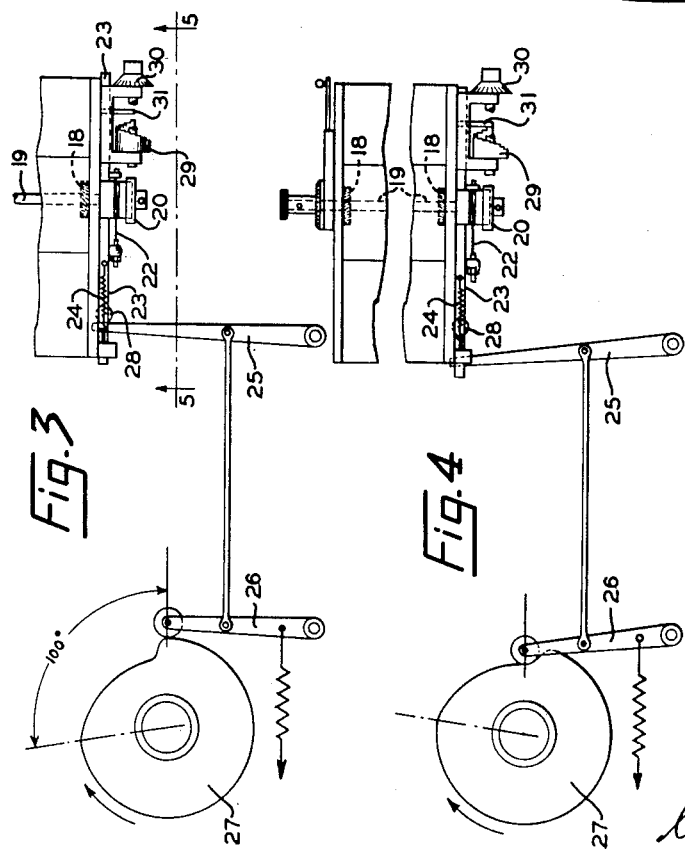
INVENTOR
HERMAN R. FREUND
BY
Curtis, Morris + Safford
ATTORNEYS

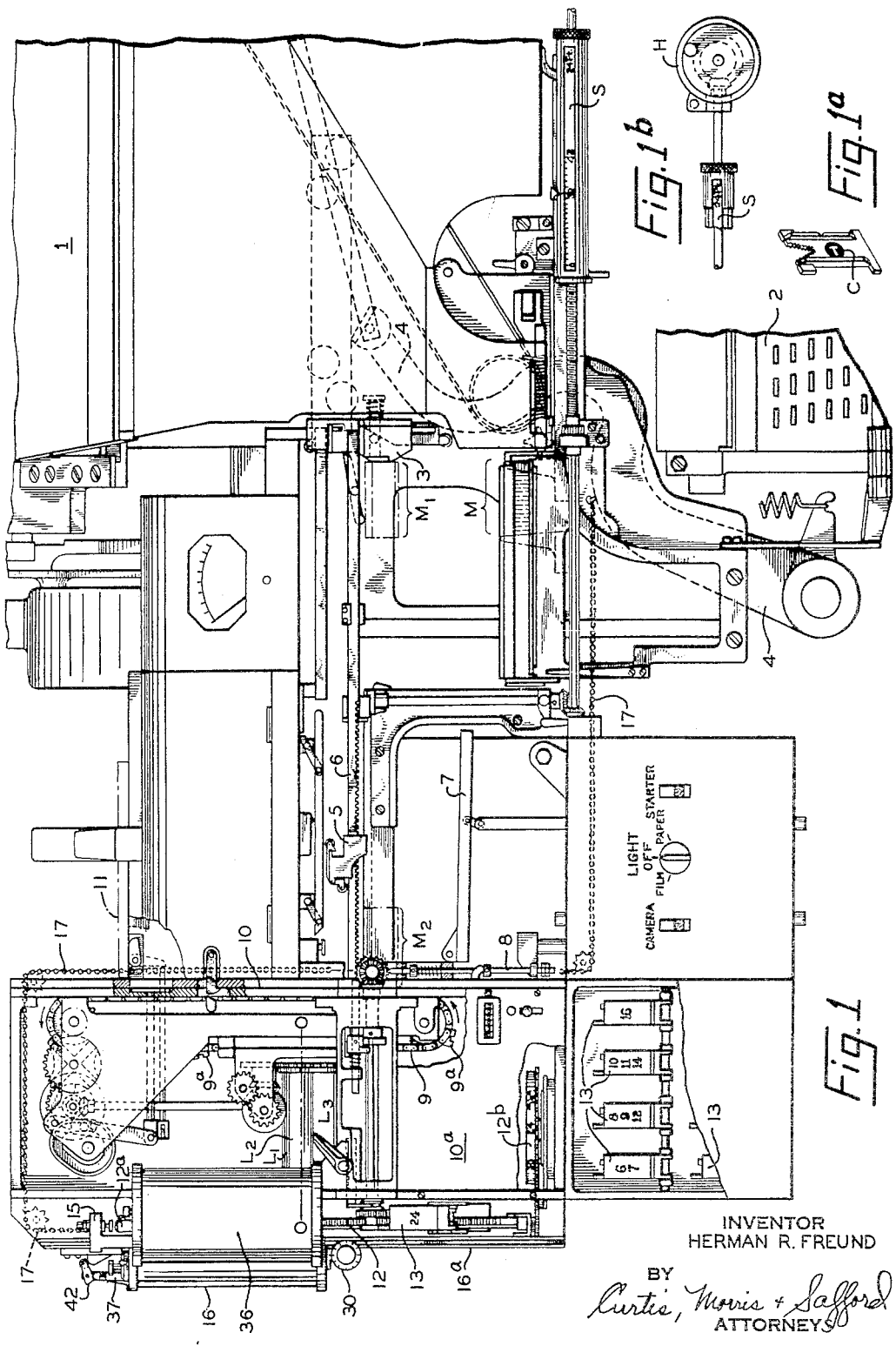

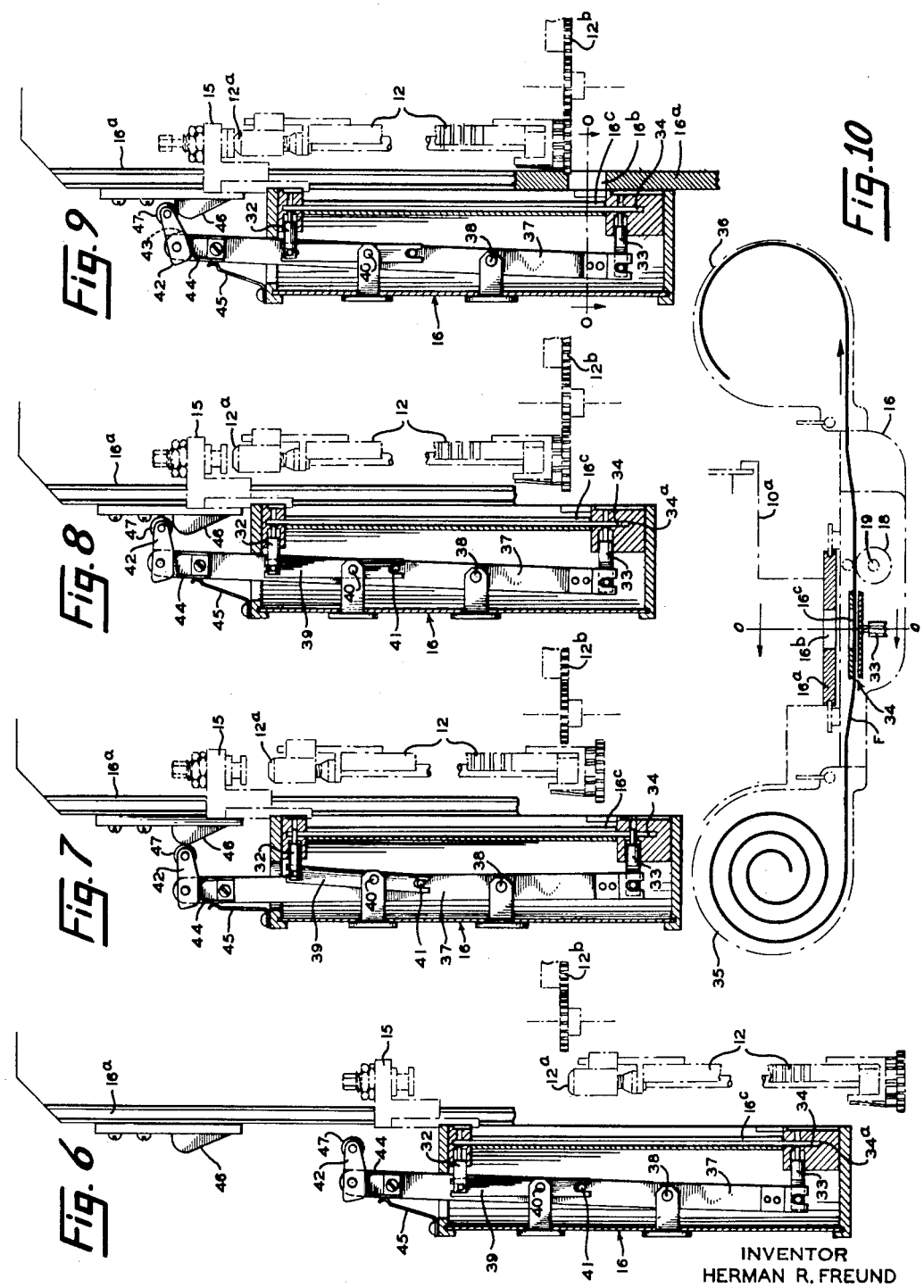

INVENTOR
HERMAN R. FREUND

United States Patent Office 2,737,097
Patented Mar. 6, 1956

2,737,097

APPARATUS FOR FORMING GUIDE INDICIA IN THE FILM OF PHOTOCOMPOSING MACHINES

Herman R. Freund, Brooklyn, N. Y., assignor to Intertype Corporation, Brooklyn, N. Y., a corporation of New York Original application January 19, 1950, Serial No. 139,422. Divided and this application October 20, 1951, Serial No. 252,242

14 Claims. (Cl. 95—4.5)

This invention relates to the typographical art and more particularly to improvements useful in effecting corrections or alterationns in type matter produced on sensitized film or paper, as in a photographic line-composing machine, and in subsequently effecting trimming, relative alignment and stripping together of units or blocks of type matter borne on different pieces of film or paper, thus to provide a composite "make-up" from which to obtain a reproduction proof and finally a planographic printing plate useful in offset and gravure printing processes.

More specifically the invention relates to apparatus within the photocomposing machine for forming guide perforations or similar indicia in the photographic film which will facilitate the subsequent removal of incorrect or unwanted lines of type matter from the film and the accurate relative alignment and mounting of corrected or additional lines of type matter on the film.

The present application is a division of my application Serial No. 139,422 filed January 19, 1950.

Among the objects of the invention are the following:

To provide mechanism operative to associate with each line of type at the time it is produced on an original or "primary" sheet of film or paper, physical indicia useful for aligning and locating purposes in subsequent correction, trimming and makeup operations, such indicia preferably being in the form of perforations made in the "primary" sheet toward the edges thereof and at the opposite ends of each line, and bearing a definite relationship to the line-starting margin and "base-alignment" level of the respective lines.

To provide such mechanism wherein the means which form the indicia are held in engagement with the film during the rapid intermittent movement of the film holder for composition of a line of type matter, to substantially eliminate any possibility of creeping movement of the film relative to the film holder.

The foregoing and other objectives of the invention and the many advantages arising from the practice thereof will be best understood from the detailed description to follow in connection with the accompanying drawings, wherein:

Figure 1 is a partial front elevation of a photographic line-composing machine having a film holder provided with punches by which to produce the physical line-locating indicia or perforations necessary to carrying out the invention.

Figure 1ª is a perspective view on a reduced scale of a character-bearing element suited to the photographic reproduction of lines of type matter in the machine shown in Fig. 1.

Figure 1ᵇ is a detail showing a hand adjusting wheel that extends from the right end of the assembler slide scale drum seen at the lower right of Fig. 1.

Fig. 2 is a perspective end elevation showing the camera unit at the left side of the machine of Fig. 1.

Figure 3 shows diagrammatically the mechanism associated with the film holder for advancing a sensitized sheet therein to different extents desired for spacing successive lines of photographic images.

Figure 4 is similar to Fig. 3 but shows the mechanism in operated position.

Figure 5 shows details of the sheet advancing mechanism as viewed from the bottom of the film holder.

Figures 6, 7, 8 and 9 are similar vertical sections through the film holder with the film supply and receiving cases removed, the sections being taken slightly to the right of the optical axis O—O as seen in Fig. 10 and the perforating punches of the invention being shown in the form thereof arranged to operate after completion of a line of exposures and before the sensitized sheet is advanced to receive a succeeding line of exposures.

Figure 10 is a schematic plan view in section through the film holder on the optical axis O—O of Figs. 1 and 9, showing a sheet of film threaded through the holder and extending from the film supply case past the exposure aperture and the perforating punches of the invention into the film receiving case.

Figure 11:
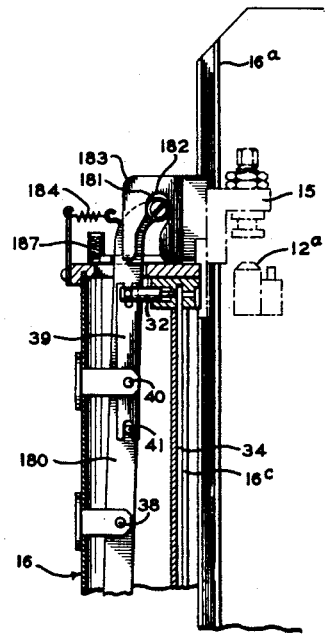

Figure 11 is similar to Fig. 8, but shows an alternative embodiment wherein the perforating punches in the film holder are arranged to operate before the start of each line of photographic exposures.

Figure 12:
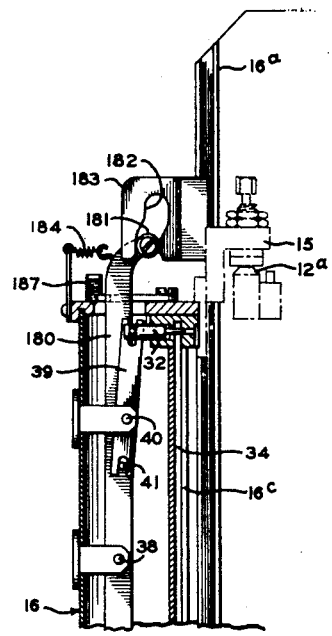

Figure 12 is similar to Fig. 11, but shows the perforating punches in operated position.

Figure 13:
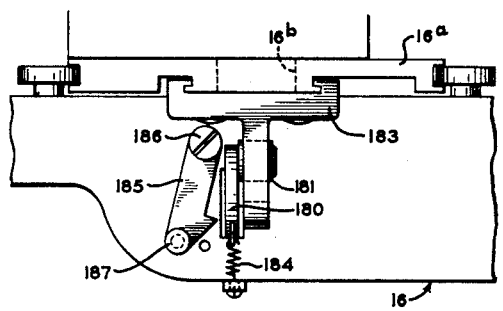

Figure 13 is an enlarged fragmentary plan view of the parts shown in Fig. 11, a latch for locking the punches against operation when the film holder is to be removed being shown in inactive position.

Figure 14:
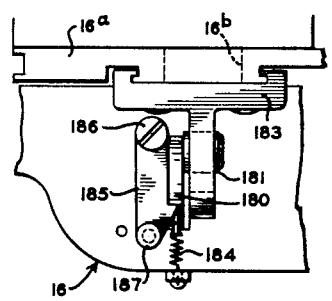

Figure 14 is similar to Fig. 13, but shows the film holder removed and the punches locked against operation.

For illustrative purposes and by way of example the invention is herein described in connection with type matter produced directly on sensitized film or paper in a photocomposing machine of the general organization shown in partial front elevation in Fig. 1. Such machine is described in detail in pending application Serial No. 94,766, filed May 23, 1949 (of which I am a co-inventor), and resembles in many respects the commercial line composing machines sold under the registered trademark "Intertype." For photographic composition, however, there is provided at the left side of the machine camera mechanism including a film holder which is movable step-by-step to receive projected images of type characters borne by individual elements or matrices of the form shown in Fig. 1ª, each element bearing a master size character which may be optically enlarged or reduced to obtain reproductions in different desired sizes of type. It will be understood however that the invention applies to type matter produced in other kinds of photocomposing machines and with the aid of character-bearing members of any form suited to the purpose of obtaining reproduced lines of type.

The present invention is concerned primarily with the film holder of the photocomposing machine and in association with which there is provided mechanism for producing the beforementioned perforations which are intended to serve as physical indicia for aligning and locating purposes in correction, trimming and makeup operations. Accordingly, taking the photo-composing machine of the foregoing pending application as an example, it is deemed sufficient for present purposes merely to briefly review the manner in which composed lines of character-bearing elements are circulated through such machine and to outline the movements of the film holder and the film contained therein whereby lines of type matter produced thereon in different type sizes are marginally aligned and spaced columnwise. For more specific details of the construction and operation of the mechanism involved in performing these functions, reference is directed to the above identified co-pending application.

Referring to Fig. 1, photographable character-bearing elements (each having a recumbently disposed negative character on a film plaque C embedded in the body of the element) are released from the storage magazine 1 in response to operation of the keyboard 2 and composed into a line in familiar manner at the assembling station M. The length of the composed line is indicated on a scale S (of which there are several suited to different type sizes) a hand wheel H, Fig. 1b, being turned to set the scale endwise to the desired em-length marking. The composed line of elements is then raised to delivery station M-1, whereupon the line-follower 3 is released and shifts the line leftward to the justifying station M-2, the follower 3 being connected in known manner to the familiar spring-urged delivery lever 4 whereby to effect such shifting of the line. At the station M-2 the line-follower 3 is stopped by and locks with the line-stop 5, the latter being locked at a pre-determined line-measure position along the line feed rack 6. After operation of justifying devices which includes the pivoted rail 7 and co-acting line-length gauging members operated thereby and carried by the follower 3, the vertical bolt 8 is depressed whereby to release the locked-together parts 3, 5 and 6 and thus subject them to the leftward urge exerted by the delivery lever 4. The justifying devices referred to are described in detail in Patent No. 2,395,659 to which reference may be had if desired.

At this time a pair of unidirectionally driven feed chains 9 are started and spaced pick-up lugs 9a thereon operate to remove the elements singly and successively from the leading end of the line of elements at the station M-2, each removed element being moved upwardly in a feed channel formed in the vertical wall 10 of the camera housing 10a, first to a photographing position on the optical axis O-O and thence to a discharging position at the top of the feed channel. Here the successively arriving elements are pushed laterally to the right onto the familiar elevator 11, which operates to transport the accumulated line of elements to distributing mechanism (not shown) associated with the magazine 1.

After each removal of an element the remaining elements in the line thereof at the station M-2 are advanced bodily leftward (under the urge of the lever 4) a distance equal to the edgewise thickness of the removed element, the thickness of the elements varying in proportion to the setwise width of their respective photographable characters. The successive leftward advances after each removal of an element are transmitted by the feed rack 6 to the vertical rack 12 and converted to downward advances of the latter through the agency of suitable gear and shaft connections between the respective racks, such connections including a pre-selected fixed-ratio gear unit 13. A supply of exchangeable gear units 13 is contained in the storage case at the bottom of the camera housing 10a, each unit being provided with a gear-train suited to effect movement of the rack 12 in a different ratio relative to the rack 6. By selecting the proper unit the advances of the rack 12 are caused to harmonize with the enlarged or reduced size of the images projected by one or another fixed focus lens L-1, L-2, L-3, etc., provided on a turret turned by a dial 14, Fig. 2, to pre-select a desired lens.

The vertical rack 12 is provided with an adjustable headpiece 12a on which freely rests an angle bracket 15 secured to the top of the light-tight film holder 16. In response to the concurrent step-by-step movements of the gear connected racks 6 and 12 as the elements are successively removed from the composed line thereof, the film holder descends by gravity to the extent necessary for proper setwise spacing of the successive letter images projected in the particular point-size type, thus to form a line of images extending vertically across the film, that is, from the bottom toward the top edge thereof. As seen in Figs. 2, 5 and 10, the film holder 16 is guided in its up and down movements by rollers which engage in a trackway at each side of the rigid vertical plate 16a. To maintain a common or uniform starting margin for lines in the different type sizes projected, the adjustable headpiece 12a which determines the line-starting point of the film holder is set to the type size being projected, as indicated on the adjusting dial 12b, the holder partaking of an initial free drop onto the headpiece 12a the moment the bolt 8 is depressed to release the feed rack 6 for feeding and photographing of the first element of the line.

Upon completion of a line of exposures the element feed chains 9 are stopped and the film holder 16 is elevated to restore it to starting position for the next line of exposures. Such restoration of the film holder is effected by a chain 17 connected to the top of the holder and extending over suitable sprockets to the delivery lever 4, the chain being slackened by swinging of the lever 4 leftward to deliver a composed line of elements to the station M-2, then partially taken up during descent of the film holder and removal of the successive elements for photographing, and finally being drawn taut to elevate the holder as the lever 4 swings to the right in returning to its starting position shown in Fig. 1. During its return stroke the lever 4, after it has partially elevated the film holder, operates to return the line-follower 3, the feed rack 6 and the vertical rack 12 to their starting positions shown in Fig. 1.

Upon full restoration of the film holder the mechanism shown in Figs. 2 to 5 operates to advance the film to the extent required for spacing the successive lines of photographic exposures. This mechanism comprises the finely milled film gripping disks 18 secured to the shaft 19 which is pinned at its lower end to the outer ring member 20 of the familiar type of slip clutch illustrated in Fig. 5. The arrangement is such that the clutch slips when its driving member 21, connected through the wire cord 22 to the endwise shiftable bar 23, turns in response to shifting of the bar to the left, but grips and turns the shaft and clutch ring 19, 20 whereby to advance the film when the bar 23 shifts to the right. The bar 23 shifts to the left, under tension of the spring 24, when the connected co-acting levers 25, 26 rock from the position shown in Fig. 3 to that shown in Fig. 4. Such rocking of the levers 25, 26 occurs in response to the depression in the contour of the cam 27 as the latter starts rotating through the last 100 degrees or thereabout to complete a cycle after restoration of the film holder. The gradual rise which immediately follows the depression in the cam 27 then rocks the levers 25, 26 from the position shown in Fig. 4 back to that shown in Fig. 3, the lever 25 engaging the stop 28 on the bar 23 and shifting the latter to the right, whereby the engaged clutch members 20, 21 operate to turn the shaft 19 and thus advance the film.

A stepped drum 29, pre-set by a dial 30 and cooperative with a pin 31 in the bar 23, limits the extent of shift of the bar to the left (in the slip direction of the clutch) and in consequence the extent of its return shift to the right for advancing the film. Ordinarily the drum 29 would be set in correspondence with the point-size of type indicated on the lens dial 14, but if it be desired to space successive lines further apart than normal for a given point-size of type, according to the well known practice of "leading-out" between lines to lengthen a column thereof, the drum 29 may be set to permit a correspondingly greater stroke of the bar 23.

According to the invention the mechanism for perforating a sheet of film or paper to provide the beforementioned physical aligning and locating indicia comprises punches associated with the film holder of the photocomposing machine. Two embodiments of such punches are shown herein, the essential difference being in the timing of their operation. Thus, in the embodiment shown in Figs. 6 to 10, actuating means are provided for operating and immediately withdrawing the punches upon completion of each line of exposures and before the sensitized sheet is advanced to receive a succeeding line of exposures. In the embodiment shown in Figs. 11 to 14, actuating means are provided for operating the punches at the start of each new line of exposures and holding them engaged in the sheet until the line of exposures is completed, then withdrawing them to permit advance of the sheet to receive the next line of exposures.

Referring first to the embodiment shown in Figs. 6 to 10, there is arranged within the film holder 16 the upper and lower punches 32 and 33 respectively, these punches being disposed toward the opposite ends of the film passage 34 so as to perforate the film within its opposite edges. As best seen in Fig. 10, the punches align vertically with the optical projection axis O—O which passes centrally through the individual exposure aperture 16$^b$ in the film holder guide plate 16$^a$, the film holder casing having the vertically elongated aperture or window 16$^c$ through which the successive exposures are made in line across the film and in alignment with the optical axis as fresh areas of the film pass the aperture 16$^b$ during the step-by-step descents of the holder. Each punch is guided in a suitable fixed block for reciprocation laterally across the passage 34 through which the film travels from the rear or supply case 35 to the front or receiving case 36, these cases being detachably secured to the holder 16 for purposes of reloading and of removing exposed portions of film at any time. As indicated, the lower punch 33 is coupled to the lower end of a lever 37 which is pivoted at 38, and the upper punch 32 is coupled to the upper end of a lever 39, the latter being pivoted at 40 and coupled at its lower end to a cross pin 41 in the lever 37.

The forked end of a pawl 42 pivoted at the upper end of the lever 37 is provided at the base of the fork with a shoulder 43, best seen in Fig. 9, which banks against the inner or right-hand edge of the lever 37 to prevent rocking of the pawl clockwise from a horizontal position, and a bow spring 44 serves to stabilize the pawl at such horizontal position. A flat spring 45 bearing against the outer edge of the lever 37 serves to urge the levers 37, 39 to the position shown in Figs. 6, 8 and 9 wherein the two punches 32, 33 are retracted clear of the film passage 34. A cam 46 secured to the film holder guide plate 16$^a$ lies in the path of a roller 47 disposed at the free end of the pawl 42.

The arrangement is such that with the film holder in its idle or restored position shown in Fig. 8, the roller 47 stands above and clear of the cam 46. As the holder descends, first to the marginal line-starting point determined by the setting of the headpiece 12$^a$, see Fig. 9, then onward for exposure of the successively removed elements, the pawl 42 simply rocks anticlockwise and flexes the bow spring 44 as the roller 47 passes over the cam 46. Such rocking of the pawl 42 imparts no movement to the punch operating levers 37, 39, and once the roller 47 clears the cam 46 the bow spring 44 acts to restore the pawl to a horizontal position. However, when the roller 47 encounters and rides over the cam 46 during elevation or restoration of the film holder (somewhat in advance of elevation of the rack 12 and its headpiece 12$^a$ from the "line-end" position shown in Fig. 6) the pawl 42 is held rigid and horizontal by reason of its shoulder 43 bearing against the inner edge of the lever 37. In consequence the levers 37, 39 are simultaneously rocked in opposition to the spring 45 and reciprocate the punches 32, 33 across the film passage 34, see Fig. 7, whereby to perforate the film opposite the ends of the line of exposures just completed. As soon as the roller 47 clears the cam 46, upon full restoration of the film holder, the spring 45 reacts on the levers 37, 39 and operates to retract the punches to the normal position shown in Fig. 8. While the perforations shown are circular, it will be understood that one or both punches may be formed to produce square or rectangular perforations and that such alternative is wholly within the purview of the invention.

Among features of primary importance to be noted in connection with the perforating operation just described are the following:

First the operation takes place automatically during elevation of the film holder and thus before the film is advanced for line-spacing purposes, such advance taking place only after the holder is fully restored. The significance of this is that perforations made before there is any movement whatever of the film relative to the punches and the optical projection axis across which the film moved to receive the successive exposures have an incontrovertibly accurate relationship to a longitudinal axis such as the horizontal base-line of the impressed line of images.

Second, regardless of the point-size of the projected images, the first image (denoting the marginal starting point of any line) is always spaced the same distance from the adjacent perforation, thus establishing a common or uniform left hand margin for lines in different type sizes. This highly important result arises from the fact that since the adjustable headpiece 12$^a$ is set to the type size being projected, the initial drop of the film holder onto this head-piece is such as to fix the line-starting point always at the same distance from the lower punch 33— the punch which is adjacent to the starting edge of the film.

Third, the perforations are made in exact alignment with the optical projection axis and bear a definite relationship to the base-line of the impressed line of images. However, such relationship changes when images are projected in other than a one-to-one ratio because, in the embodiment herein used for illustrative purpose, the base-line chosen for locating the characters on the elements of the "master" point-size font is not coincident with the optical center of the lens but is established at a level offset from such optical center (actually below it) by a predetermined amount. Accordingly, when optically enlarged or reduced images are projected, their base-line either recedes from or approaches the optical projection axis on which the punches are located in direct proportion to the degree of enlargement or reduction. Such condition would be obviated, of course, by establishing the base-line of the "master" characters at a level coincident with the optical center of the lens and it will be understood that such arrangement is wholly within the scope of the present invention.

In spite of this variable factor it remains that the perforations are related systematically and accurately to the horizontal base-line as well as the marginal line-starting point of lines of images projected in all different type sizes. Thus, a line drawn through the perforations at opposite ends of any reproduced line is exactly parallel to the base-line of the type images, and a line drawn through the perforations in a columnwise direction is exactly perpendicular to such base-line and parallel to the line-starting margin. Accordingly, the perforations provide a positive mechanical gauge by which to locate and align any line or group of lines both horizontally and vertically relative to the line-strip punch for making corrections and to the trimming board and the make-up instrumentalities of the invention, all as described in my aforementioned parent application.

Turning to the embodiment of the punches as illustrated in Figs. 11 to 14, it will be seen by comparison with Fig. 8 that the essential difference lies in the actuating connections at the top of the film holder 16.

According to this embodiment the punches are operated to perforate the film before the start of each new line of exposures and remain engaged in the film until the line of exposures is completed and the film holder is returned to its normal "up" position, Fig. 11, whereupon the punches are withdrawn to permit the necessary line-space advance of the film. The principal advantage of this arrangement is that the punches engaged in the film during the downward and return movements of the holder positively anchor the film against any possible movement or creeping such as might arise, for example, from vibration during its rapid step-by-step descents between successive exposures.

To actuate the punches in the foregoing manner the lever 37, Fig. 8, which is pivoted at 38 and operates the lower punch 33 is replaced by the similar purpose lever 180 also pivoted at 38. As shown, the lever 180 is offset at its upper end where it is provided with a roller 181, the latter being adapted to cooperate with a box cam 182 formed in a bracket 183 which is suitably secured to the film holder guide plate 16ª. A spring 184 urges the lever 180 anti-clockwise. The arrangement is such that when the film holder is in its normal "up" position as in Fig. 11, engagement of the roller 181 in the upper end of the box cam 182 rocks the lever 180 and by it the lever 39, against the tension of spring 184, to positions in which the punches 32 and 33 are held retracted clear of the film passage 34. However, when the film holder is released and drops freely to the line-starting position determined by the setting of the head-piece 12ª, all as previously described, the offset form of the box cam 182 rocks the lever 181 anti-clockwise which in turn rocks the lever 39 clockwise to the positions shown in Fig. 11. As evident, such rocking of these levers drives the punches 32 and 33 across the film passage 34 to perforate the film therein.

The spring 184 now serves to hold the punches engaged in the film as the holder descends to complete a line of exposures and until, toward the end of the return movement of the holder to its normal position shown in Fig. 11, the box cam 182 acting on the lever 180 rocks the latter and the lever 39 to a position for retracting the punches.

When for any reason it is desired to remove the film holder from the machine, such may be done by removing the cam bracket 183 (or the bracket carrying the punch actuating cam 46 of Fig. 8), then sliding the holder upward off the upper end of the guide plate 16ª. However, since removal of the cam bracket 183 would obviously free the punches for operation by the spring 184, there is provided a manual locking latch 185 as best seen in Figs. 13 and 14. This latch is pivoted at 186 and provided at its free end with a spring and ball detent 187 adapted to hold it normally in the inactive position shown in Fig. 13. If the film holder is to be removed the latch is moved to the position shown in Fig. 14 where it hooks behind the lever 180 and thus holds the latter and in turn the punches against operation by the spring 184. Of course if no film is in the holder at the time it is to be removed the latch 185 need not be used, but in the presence of film at such time the latch not only prevents unnecessary action of the punches but avoids the possibility that the spring 184 may not drive them through the film. The punches would then merely press against the film and any attempt thereafter to advance it by hand after removing the holder might result in scratching or other damage.

I claim as my invention:

1. In a photographic line composing machine, the combination of a film holder movable relative to an aperture; intermittently operated driving means operable to present typographical characters of a composed line thereof in succession on an optical axis aligned with said aperture to expose the characters individually in line across film within said holder, said driving means including connections cooperative with said holder for moving it in steps from a line-starting position in timed relation with presentation of the respective characters on said optical axis and for returning the holder to the line-starting position upon completion of a line of exposures; punches mounted in said holder for perforating the film toward its opposite edges and disposed in predetermined aligned relation with the optical axis, and operating means timed to actuate said punches to perforate the film during return movement of the holder to its line-starting position.

2. The combination recited in claim 1, wherein the operating means for actuating the punches comprises levers mechanically coupled together and to the respective punches and includes a cam adapted to rock said levers to operate the punches in unison, said cam and levers being related for cooperation to so rock the levers during return movement of the film holder to its line-starting position.

3. The combination recited in claim 1 wherein means are provided for advancing the film endwise to receive successive lines of exposures in columnwise spaced relation, said means comprising members timed for operation to advance the film upon full return of the film holder to its line-starting position.

4. In a photographic line composing machine, the combination of a film holder and a set of optical projection elements aligned on an optical axis, said film holder and said axis being movable relative to one another, movable means operable to move typographical characters in succession across said optical axis to expose the respective characters individually in line across a sensitized sheet within said holder, driving means operable in timed relation with said movable means for causing relative movement between the film holder and the optical axis from a line-starting position in steps to receive the successive exposures, feeding means engaging the sensitized sheet and adapted to advance it endwise relative to said optical axis to predetermined positions for receiving successive lines of exposures in spaced relation in a columnwise direction, punches mounted in the film holder for perforating the sensitized sheet toward its opposite edges and in parallel aligned relation with a longitudinal axis of each line of exposures, and actuating means for operating said punches after each advance of the sheet and before the next relative movement of the film holder and said optical axis from said line-starting position.

5. In a photographic line composing machine having means for composing a line of character-bearing elements and having a film holder and an exposure aperture for exposing the characters of said elements on a sensitized sheet within said holder, the combination of driving means including connections for relatively moving the film holder and the composed line of elements from a line-starting position to expose through said aperture the characters of said elements individually for reproduction successively in line across the sensitized sheet, releasable means independent of the composed line of elements for holding the film holder in an idle position spaced from the line starting position, said holder being adapted in response to release of said releasable means to shift to the line-starting position, punches mounted in the film holder for perforating the sensitized sheet marginally and in a predetermined relationship to each line of reproductions made thereon, and operating means including holding means for actuating said punches in timed relation with shifting of the film holder to the line-starting position and for holding the punches engaged in the sensitized sheet at least until a line of reproductions is completed.

6. The combination recited in claim 5, including a part cooperative with the punches at the idle position of the film holder to withdraw them from engagement with the sensitized sheet, said part being adapted also to actuate the punches as the film holder shifts from its idle position to the line-starting position.

7. In a photographic line composing machine having means for supporting a composed line of character-bearing elements and having a film holder and an aperture for exposing the characters of said elements on a sensitized sheet within said holder, the combination of movable supporting means operable to move the elements of said composed line across an optical axis aligned with said aperture to expose their characters individually in line across said sensitized sheet, driving means cooperative with the film holder and operative to move it from an idle position to a line-starting position and from the latter position in steps timed with movement of the character-bearing elements across the optical axis, means for returning the film holder to said idle position upon completion of a line of exposures and sheet feeding means operative upon such return of the holder to advance the sensitized sheet endwise to receive a new line of exposures, punches mounted in the film holder for perforating the sheet toward its opposite edges and in predetermined aligned relation with the optical projection axis of each line of exposures, and operating means for actuating said punches in timed relation with each movement of the film holder from its idle position to the line-starting position, said operating means including devices operative to hold the punches engaged in the sheet until the film holder is returned to its idle position.

8. The combination recited in claim 7, including a part cooperative with the punches at the idle position of the film holder to withdraw them from engagement with the sensitized sheet.

9. The combination recited in claim 7, wherein the punches are connected by levers for operation in unison, and wherein the operating means for actuating the punches comprises a part cooperative with said levers at the idle position of the film holder, said part being adapted to rock said levers to move the punches in a direction to perforate the sheet as the film holder shifts from said idle position to the line-starting position and to rock the levers to withdraw the punches during return movement of the film holder to said idle position.

10. In a photographic line composing machine having means for supporting a composed line of character-bearing elements and having a film holder and an aperture for exposing the characters of said elements on a sensitized sheet within said holder, the combination of driving means operable to move the elements of said composed line across an optical axis aligned with said aperture to expose their characters individually in line across said sensitized sheet, driving connections cooperative with said film holder and operative to move it step-by-step from a line-starting position in timed relation with movement of the character-bearing elements across the optical axis and until all of said elements are exposed, releasable means holding the film holder in an idle position spaced from the line-starting position, said holder being adapted in response to release of said releasable means to shift from said idle position to the line-starting position, punches mounted in the film holder for perforating the sensitized sheet toward its opposite edges and in predetermined relation with the optical projection axis of a line of exposures, and operating means for actuating said punches upon movement of the film holder in response to release of said releasable means, said operating means including devices for holding the punches engaged in the film during the step-by-step movements of the film holder in response to said driving connections.

11. In a photographic line composing machine, the combination of a movably mounted film holder adapted to support a sensitized film, means to cause step-wise movement of said film holder from a starting position along a line transverse to said film to present successive portions of said film on an optical projection axis to receive images of a succession of typographical characters spaced along said film in a composed line of character images and return movement of said film to its starting position, film feeding means mounted in said film holder and engaging said film, timing means adapted to actuate said film feeding means to advance said film endwise during the interval when said film holder is in its starting position and thereby space successive lines of said character images in a columnwise direction, punches mounted in said film holder for movement in a direction normal to the surface of said film for perforating said film, means for actuating said punches to perforate said film and to remain in engagement with said film during substantially all of the movement of said film holder and to withdraw from said film when said film holder returns to its starting position.

12. In a photographic line composing machine, the combination of a movably mounted film holder adapted to support a sensitized film, means to cause step-wise movement of said film holder from a starting position along a line transverse to said film to present successive portions of said film on an optical projection axis to receive images of a succession of typographical characters spaced along said film in a composed line of character images and return movement of said film to its starting position, film feeding means mounted in said film holder and engaging said film, timing means adapted to actuate said film feeding means to advance said film endwise during the interval when said film holder is in its starting position and thereby space successive lines of said character images in a columnwise direction, punches mounted in said film holder for movement in a direction normal to the surface of said film for perforating said film, spring means urging said punches toward said film, a cam surface mounted adjacent the path of movement of said film holder near its starting position, and a punch actuating linkage mechanically connected to said punches and positioned to engage said cam surface and be actuated thereby to cause withdrawal of said punches from said film against the urging of said spring means when said film holder is in its starting position and to disengage said cam surface to allow said spring means to move said punches to perforate said film and hold said punches in engagement with said film during movement of said film holder and substantially until said film holder returns to its starting position.

13. In a photographic line composing machine having supporting means for a composed line of character-bearing elements and having a film holder and an aperture for exposing the characters of said elements on film within said holder, the combination of element moving means operative to present the elements of said composed line individually for exposure in succession on an optical axis aligned with said aperture, mechanically connected means cooperative with said composed line of elements and said film holder and operative in response to said element moving means to move the film holder from a line-starting position in steps variant in extent according to the setwise widths of the characters of the elements successively presented for exposure, means for returning the film holder to its line-starting position upon completion of a line of exposures and means for advancing the film to receive a succeeding line of exposures, punches mounted in the film holder in predetermined aligned relation with said aperture and spaced apart a distance less than the width of the film therein, and operating means timed to actuate said punches to perforate the film during return movement of the film holder to its line-starting position and before advance of the film to receive a succeeding line of exposures.

14. In a photographic line composing machine, the combination of a film holder movable relative to an aperture, mechanism including power driven devices operative to present typographical characters in orderly composed succession on an optical axis aligned with said aperture to expose the characters individually in line across a sensitized sheet within said holder, said mechanism including connections for moving said holder in steps from a line-starting position to receive the successive exposures and for returning the holder to said line-starting position upon completion of a line of exposures, moving means operative to advance the sensitized sheet endwise to receive successive lines of exposures in column-wise spaced relation, punches mounted within the film holder, said punches being spaced apart a distance less than the width of the sensitized sheet therein and adapted to perforate the sensitized sheet near its opposite edges and in predetermined parallel relation with each line of character exposures made on the sheet, and actuating means timed to relatively move said punches and the sheet to perforate the latter after completion of a line of exposures and during return movement of the film holder to its line-starting position.

References Cited in the file of this patent

UNITED STATES PATENTS

| | | |
|---|---|---|
| 1,975,439 | Uher | Oct. 2, 1934 |
| 2,227,987 | Tuttle | Jan. 7, 1941 |
| 2,552,882 | Freund | May 15, 1951 |